United States Patent Office 3,305,397

Patented Feb. 21, 1967

3,305,397

METHOD OF PRODUCING CHARGED NEGATIVE CADMIUM ELECTRODE BY SPRAYING WITH MOLTEN MIXTURE OF CADMIUM AND A METAL DISPLACED BY TREATMENT WITH A CADMIUM SALT AND HYDROFLUORIC ACID BATH

Robert E. Stark, Avon Lake, Ohio, assignor to Union Carbide Corporation, a corporation of New York No Drawing. Filed Mar. 27, 1963, Ser. No. 268,465
2 Claims. (Cl. 136—24)

This invention is directed to a method of making charged negative electrodes for use in alkaline secondary batteries.

It is an object of the invention to provide means for manufacturing charged negative electrodes.

It is another object to eliminate the formation process which is necessary when electrodes are manufactured in the uncharged condition.

Broadly, the present invention contemplates simultaneously spraying molten cadmium and a molten cadmium replacing metal onto a suitable carrier substrate, immersing the substrate bearing the adherent sprayed metal in a cadmium salt solution and chemically displacing the cadmium replacing metal from the carrier and depositing in its place porous or spongy cadmium metal from a cadmium salt solution.

The cadmium replacing metals suitable for use in the present invention are those metals which are above cadmium in the electromotive series. The electromotive series is a list of metals arranged in the decreasing order of their tendencies to pass into ionic form by losing electrons.

Suitable metals include aluminum, zinc, magnesium, iron, and the like. Highly preferred metals are aluminum and zinc.

Suitable cadmium salts include cadmium sulfate, cadmium chloride, cadmium acetate, cadmium bromide, and cadmium nitrate.

Several types of metal spraying equipment are available which are suitable for practice of the present invention. Molten metal may be atomized from a reservoir thereof and sprayed on the carrier grid by means of compressed air. In another type of metal spraying equipment metal wire is fed into an oxygen-acetylene flame, melted therein and sprayed onto the carrier. When this latter type of metal spraying equipment is employed, a reducing flame is preferred in order to minimize oxidation of the cadmium metal.

The molten metals can be conveniently sprayed onto one or both sides of a continuously moving strip of a substrate or carrier material.

The weight ratio of cadmium to cadmium replacing metal which is sprayed into or onto the substrate may range from about 2:1 to about 20:1 or higher. It is essential that there be some minimum amount of cadmium present to serve as a matrix on which to subsequently deposit the spongy cadmium. The ratio of cadmium to cadmium replacing metal has been found to influence the final void volume, and therefore the surface area of the electrode. The percent void volume may be defined as: 100 minus "percent-packing." "Percent-packing" is the ratio of the measured density to the theoretical density multiplied by 100. As the cadmium sponge is deposited in the cadmium matrix, the void volume of the sprayed structure decreases. With a high sprayed cadmium to cadmium replacing metal ratio, all cadmium replacing the metal can be subsequently replaced by cadmium sponge without great loss of void volume. With a low ratio only a part of the cadmium replacing metal could be replaced by sponge cadmium. The balance of the cadmium replacing metal would not be replaced in order to maintain the necessary void volume. Thus providing a final void volume of the preferred magnitude, i.e., 55 to 75 percent and the proper electrode weight requires a balancing of the ratio of sprayed cadmium to cadmium replacing metal, the initial void volume of the sprayed metal, the amount of cadmium replacing metal which is actually replaced by sponge cadmium and the leaching out of excess cadmium replacing metal. Control over the initial composition, e.g., the ratio of sprayed cadmium to aluminum is the most practical method of controlling the void volume. The term "void volume" is used to represent the volume of a plurality of tiny voids uniformly distributed throughout the matrix.

Highly satisfactory electrodes have been produced using ratios of from about 3.4 to about 16.5. Although a final high void volume is desirable as far as increasing the final surface area is concerned, it is limited by the need for an adherent continuous supporting matrix.

After the molten metals have been sprayed on the carrier substrate, the carrier is passed through an aqueous solution of a cadmium salt, e.g., cadmium sulfate, cadmium chloride, cadmium acetate and the like. The cadmium replacing metal is replaced in total or in part by a highly porous, high surface area cadmium called "sponge cadmium," from the solution, the sponge cadmium being deposited within the framework of the sprayed cadmium matrix. The efficiency of the replacement reaction has been found to be between 75 and 85 percent inasmuch as some of cadmium replacing metal may react with the solution to release hydrogen.

In formulating the cadmium salt bath, some means must be employed to prevent or minimize passivation of the cadmium replacing metal. This can be conveniently accomplished by acidifying the bath with hydrofluoric acid in amounts which may range from about 1 to about 5 percent.

The concentration of cadmium salt in the bath is not narrowly critical provided there is sufficient cadmium to replace the desired amount of cadmium replacing metal at a reasonable rate. In general the cadmium salt concentration may range from 0.01 molar to a saturated solution. Satisfactory results have been obtained in baths having 0.3 weight percent cadmium sulfate.

The temperature of the cadmium salt bath and the period of immersion are factors which depend, at least in part, on the characteristics required in the final electrode. In general the temperature may range from about 20 to 100° C. The time required for deposition of the cadmium metal is particularly dependent on the rate of deposition and the total amount of cadmium to be deposited.

After the deposition of the cadmium sponge, it may be desired to remove some or all of the excess cadmium replacing metal. This may conveniently be accomplished by washing the strip in water and then immersing it in an alkaline solution, e.g., potassium hydroxide, sodium hydroxide, calcium hydroxide; and the like. Inasmuch as the presence of alkali increases the tendency of cadmium metal to oxidize, the alkali must be removed by passing the electrode strip through an aqueous solution of a weak acid such as boric acid and then washing in water. Alternatively, any residual alkali may be removed by thorough washing of the electrode with water. Ultrasonics can be employed to facilitate washing and eliminate the need for a mild acid bath.

Traces of cadmium replacing metal and its salts, e.g., aluminum and aluminum sulfate, do not appear to affect the performance of the electrode. Consequently the alkaline leaching operation may be eliminated for some vented cell constructions.

The carriers can be constructed of any suitable material, e.g., nickel, iron, copper, silver, plastic, and the like. Nickel is a preferred material for use in nickel-cadmium cells. When non conductive materials such as plastics are employed, the conductivity of the electrode must be increased through the incorporation of conductive materials such as graphite or nickel powder.

The use of perforated metal foils, mesh screens or expanded metal screens is preferred since such substrates increase the adhesion of the cadmium metal and the flexibility of the electrode.

The following examples will further illustrate the present invention.

*Example I*

Cadmium and aluminum were flame-sprayed onto a moving carrier substrate in ratio of 3.44 grams of cadmium per gram of aluminum to form a coating 0.0185 inch thick. The sprayed coating contained 0.55 gram of sprayed metal per square inch. The coated substrate was then passed through a bath containing 20 grams of cadmium sulfate, 100 cubic centimeters of 48 percent hydrofluoric acid and 900 cubic centimeters of water. The electrode was immersed in the bath for 12 minutes at a temperature of approximately 80° F. After the deposition of the sponge cadmium the electrode was washed in running water at a temperature of 60° F. for a period of 16 hours and then immersed in 12 normal potassium hydroxide at 80° F. for 24 minutes. Residual traces of potassium hydroxide were removed by washing in running water at 60° F. for 16 hours. After removal of the traces of potassium hydroxide the electrode was dried in a nitrogen atmosphere and tested. The electrode had a service life of 67 minutes at 110 milliamperes per square inch and a passivity current density of 425 milliamperes per square inch.

*Example II*

Cadmium and aluminum were flame-sprayed on a carrier substrate in a ratio of 2.91 grams of cadmium per gram of aluminum to form a metallic coating 0.0135 inch thick which weighed 0.086 gram per square inch.

The coated substrate was then immersed in a bath containing 3.5 grams of cadmium sulfate, 103 cubic centimeters of 48 percent hydrofluoric acid and 946 cubic centimeters of water, at a temperature of 80° F., for a period of 60 minutes. After immersion the electrode was washed in running water at 60° F. for 16 hours and then immersed in 12 normal potassium hydroxide at 80° F. for 60 minutes.

Residual potassium hydroxide was removed by again washing the electrode in 60° F. running water for 16 hours. After being dried in a nitrogen atmosphere, the electrode had a service life of 137 minutes at 37 milliamperes per square inch and a passivity current density of 425 milliamperes per square inch.

It will be appreciated that the charged negative electrodes made as described herein may be used in many types of secondary alkaline batteries in any case where a cadmium electrode is required. While the invention has been described in terms of nickel-cadmium batteries it is equally adaptable to preparation of cadmium electrodes for use in silver-cadmium batteries.

What is claimed is:

1. A method for the production of charged state negative electrodes for use in nickel-cadmium batteries which comprises the steps of spraying an admixture of molten cadmium and molten metal selected from the group consisting of aluminum, zinc, magnesium, and iron in a ratio of about 2 to 1 to about 20 to 1 onto a carrier substrate, immersing the sprayed substrate in an aqueous solution containing a salt selected from the group consisting of cadmium sulfate, cadmium chloride, cadmium acetate, cadmium bromide, and cadmium nitrate and 1–5 percent hydrofluoric acid, said salt being in a concentration of at least 0.01 molar, for a period of time sufficient to displace substantially all the metal of said selected group of metals and deposit therefor spongy cadmium, said method producing an electrode having a final void volume of between 55 and 75 volume percent.

2. A method for the production of charged negative electrodes for use in nickel-cadmium batteries which comprises the steps of spraying an admixture of molten cadmium and molten aluminum in a ratio between 3.4 to 1 and 16.5 to 1 onto a carrier substrate, immersing the sprayed substrate in an aqueous solution containing cadmium sulfate and 1–5 percent hydrofluoric acid, said cadmium sulfate being in a concentration of at least 0.01 molar, for a period of time sufficient to displace substantially all the aluminum with spongy cadmium, said method producing an electrode having a final void volume of between 55 and 75 volume percent.

References Cited by the Examiner

UNITED STATES PATENTS

| | | | |
|---|---|---|---|
| 2,222,398 | 11/1940 | Brown | 204—50 |
| 2,562,906 | 8/1951 | Hadley | 136—100 |
| 2,653,179 | 9/1953 | Baldwin | 136—24 |
| 2,662,928 | 12/1953 | Brennan | 136—24 |
| 2,678,342 | 5/1954 | Porter | 136—91 |
| 2,873,214 | 2/1959 | Schnable | 117—130 |

OTHER REFERENCES

Hodgman: Handbook of Chemistry and Physics, 35th Edition, 1953, page 1651.

WINSTON A. DOUGLAS, *Primary Examiner.*

MURRAY TILLMAN, *Examiner.*

B. J. OHLENDORF, *Assistant Examiner.*